United States Patent
Staley

Patent Number: 6,073,123
Date of Patent: Jun. 6, 2000

[54] METHOD AND APPARATUS FOR DETECTING UNAUTHORIZED COPIES OF SOFTWARE

[76] Inventor: Clinton A. Staley, 7440 Pinal Ave., Astascadero, Calif. 93422

[21] Appl. No.: 08/807,047

[22] Filed: Feb. 26, 1997

[51] Int. Cl.$^7$ .................................................... G06F 17/60
[52] U.S. Cl. ............................... 705/58; 705/57; 705/51; 705/52; 705/59
[58] Field of Search .................................. 705/1, 51, 52, 705/57, 58, 59; 380/3, 4, 5

[56] References Cited

U.S. PATENT DOCUMENTS

| | | | |
|---|---|---|---|
| 4,658,093 | 4/1987 | Hellman | 380/25 |
| 4,740,890 | 4/1988 | William | 713/200 |
| 5,592,651 | 1/1997 | Rackman | 711/163 |
| 5,754,864 | 5/1998 | Hill | 395/712 |
| 5,790,664 | 8/1998 | Coley et al. | 380/4 |
| 5,930,357 | 7/1999 | Fukui | 380/4 |
| 5,964,876 | 10/1999 | Shimomura et al. | 713/200 |

OTHER PUBLICATIONS

Y. Malhotra, *Controlling Copyright Infringements of Intellectual Property*, Journal of Systems Management, v45 n7, pp. 12–17.

D. Grover, *The protection of Computer Software*, 1989, Cambridge University Press, Table of Contents and pp. 1–22, an overview chapter.

*Primary Examiner*—James P. Trammell
*Assistant Examiner*—Nicholas David Rosen
*Attorney, Agent, or Firm*—Blakely Sokoloff Taylor & Zafman, LLP

[57] ABSTRACT

A method and apparatus for detecting unauthorized copies of software. Each copy of software is uniquely identified by a license number. Each use of each copy is termed a session. Each copy's sessions are numbered sequentially. Each session is assigned a random session stamp when it begins. For each copy, a stamp history is kept, giving the next session number and the session stamps for prior sessions. If software copies having the same license number are used on two different computers, their stamp histories will show different next-session numbers and/or different session stamps for prior sessions, indicating two copies of the software exist, which may be, e.g., a license violation. Each software copy maintains a stamp history database (SHD) comprising a stamp history for itself and for other copies of software for which it has received a stamp history. When a software copy creates data files or transmits information over a network, it attaches all or part of its SHD to the files or information, in order to relay stamp history data to other copies of software. When another software copy receives the data files or information, it updates its own SHD using the attached SHD information. In addition to protection of a software copy, the present method can be applied to protection of a data set, detecting old versions of software that remain in use after newer versions have been installed, and to limit the number of times a copy of software is executed.

27 Claims, 4 Drawing Sheets

METHOD AND APPARATUS FOR DETECTING UNAUTHORIZED COPIES OF SOFTWARE

BACKGROUND OF THE INVENTION

1. Field of the Invention

The present invention is related to the field of software copy protection and data copy protection.

2. Description of the Related Art

Existing methods for software copy detection usually fall in one of several categories. The first category causes the software to detect some property of the hardware on which it runs, and to stop running if that property is not present. The "hardware property" varies with each method. Some methods check the built-in CPU serial number that is available on high-end workstations and mainframes. Others check the number and type of I/O devices on the computer. Both of these methods make it difficult to move the software from one computer to another. A third method that is currently quite common for high-end software requires the user to attach a hardware key or "dongle" device to one of the computer's ports. This approach works only for expensive software because of the added cost of the dongle, and it becomes cumbersome when several different programs require different and incompatible dongles.

Another category of methods works on a computer network and uses a "license server" program to check on licensing. Each time the protected software is run on a computer, it requests permission from the license server via the network. The license server allows only a limited number of software copies to be running simultaneously on the network. This method is quite flexible, but requires users to be on a common network, does not protect nonnetworked software copies, and is relatively easy to defeat. It is most effective with trusted users who are simply seeking a way to conveniently ensure their adherence to the license agreement.

A third category of software copy-protection methods that often appears in publications, but which is presently not widely used in industry, involves marking each individual software copy of the software by making innocuous and undetectable alterations in the code. It is generally possible to find dozens of minor ways in which a software program can be altered without affecting its function, and each software copy can be "fingerprinted" or "watermarked" with a unique set of such modifications. This makes it possible to determine the original source of an illegitimate software copy. This method could provide strong disincentives for piracy, but it generally requires the threat of legal action against a user to make it effective. Also, this method does not prevent software copies from being made without the original licensee's knowledge (as is common in workplaces and schools, where workers or students often make copies of institutional software for home use.) What is needed is a flexible, relatively inexpensive method for detecting copying of software by any user, licensee, or otherwise, regardless of the computing environment in which the copied software is used.

BRIEF SUMMARY OF THE INVENTION

A method and apparatus for detecting copying of software is described. The method provides comprehensive protection for any and all software in any computing environment, whether, e.g., a mainframe, workstation, desktop, or client/server computing environment. Each copy of software is given a unique license number. Each use of each software copy is termed a session, and each copy's sessions are numbered sequentially. Every use of the software may thus be uniquely identified by the license number of the software copy and the session number associated with each use of the software copy. Each session is assigned a random session stamp when it begins. For each software copy, a stamp history is kept, giving the next session number and the session stamps for some subset of prior sessions. Each time a session begins, the stamp history associated with the software copy is updated with the session number of the session. If software copies having the same license number are used on two different computers, their stamp histories will show different next-session numbers and/or different session stamps for prior sessions, indicating a potential license violation. Each software copy maintains a stamp history database (SHD) comprising the stamp history for itself and the stamp histories for other copies of software of which it is aware. When a software copy creates data files or transmits information over a network, it attaches all or part of its SHD to the files or information, in order to relay stamp history data to other copies of software. When another software copy receives the data files or information via the network, it updates its own SHD using the attached SHD information. This process is termed SHD transfer, and the attached stamp histories are said to be transferred.

In order to ensure reasonable distribution of a recently updated stamp history, the present invention provides for each stamp history to indicate a send count, representing the minimum number of other software copies to which the stamp history should be sent after an update to the stamp history occurs. The send count is set to some initial value whenever the stamp history is updated. When a software copy transfers the stamp history as part of an SHD transfer, it distributes between itself (the sending copy) and the software copy receiving the SHD transfer (the receiving copy) the responsibility to send the stamp history to other software copies. The sending copy does this by replacing the current send count with a fraction of the send count in the stamp history included in the SHD transfer, and writing the remainder of the current send count into the stamp history in its own SHD. Both the sending and receiving copies will then have a portion of the responsibility to transfer the stamp history to still other software copies.

Protection of data sets may be also be arranged by encrypting the data, and using software copy protected according to the method described herein to view the data. The data set is encrypted using the license number of a particular copy of the software as the encryption key, so that only that software copy can decrypt and display the data set. (Separately encrypted versions of the data would be needed for each software copy that is to read the data set.) Since only one copy of the software can decrypt a given copy of the data set, and since the software itself is copy-protected, duplicate copies of the data set are of no value except for backup purposes. Alternatively, the data set can include, in encrypted form, a list of the license numbers corresponding to copies of software that are permitted to read it, and the software can be designed so that the user is prevented from displaying the data set unless the license number of the software performing the display is one of those listed.

The method described herein may also be used to detect outdated versions of software that remain in use after newer versions of software have been installed. A new version of a software copy is assigned the same license number as the older version of the copy, and the older copy's stamp history is copied into the new version's SHD. If the older version remains in use on the same or another computer, session stamp conflicts will arise just as they would if two copies of the newer software were in use, since the old and the new version have the same license number.

The method described herein may also be used to limit the number of times a copy of software is executed by designing the software to cease executing once a certain session number has been reached.

DETAILED DESCRIPTION OF THE INVENTION

Described is a method for detecting copying of software to prevent the unauthorized duplication of such software. In the following description, numerous specific details are set forth in order to provide a thorough understanding of the present invention. It will be apparent, however, to one of ordinary skill in the art that the present invention may be practiced without these specific details. In other instances, well-known algorithms, practices, and techniques have not been shown to avoid unnecessarily obscuring the present invention.

According to the present invention, a unique license number is assigned to each copy of the software to be protected. This license number is installed in permanent storage in an encrypted form readable only by the software. (Under Microsoft Windows 95™, for instance, a registry entry may be utilized.) Identical license numbers for two copies of the same software is an indication that one or both copies may be illegitimate or pirated.

Each software copy maintains information on sessions for itself and for other software copies on the same or other computers from which it has received data files or information. The definition of a session in one embodiment is a single execution of the software. However, sessions might be defined as beginning every other time the software is run, or every time a new computation begins or a new file is opened. The exact definition of a session is not necessarily important. Rather, each software copy must simply mark the beginning of a new session, however that session is defined, at reasonable intervals. Each software copy's sessions are numbered sequentially with a session number.

Each session is assigned a random session stamp when it begins. This may be done by calling a random number generator using the system clock of the computer to obtain a seed value, or by any number of other methods well known in the art. However, the method used to generate each session stamp must produce independent random values when two different copies of the software with the same license number (thus pirated copies) generate session stamps for the same session number. Session stamps may be small values. In the preferred embodiment, session stamps range from 0 to 14, so that each session stamp may be stored in a half-byte (i.e., 4 bits), with the value 15 reserved to indicate, e.g., license violations as described below.

Figure 1:
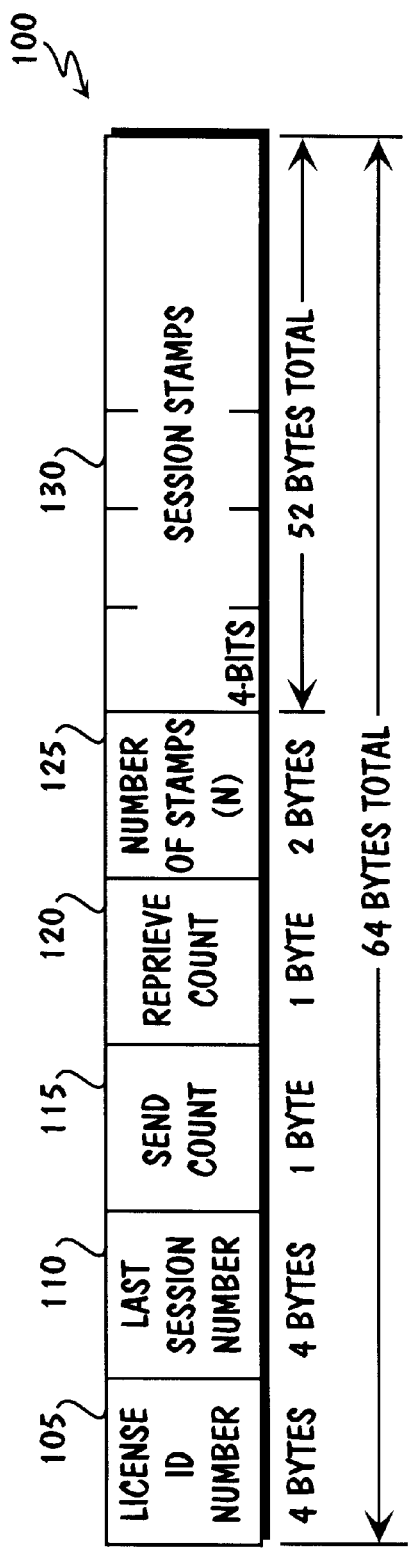
FIG. 1 is a diagram of a data structure for storing a stamp history.

Each software copy also maintains a stamp history database (SHD), again in encrypted form in permanent storage. This stamp history database contains a number of stamp histories, one for each of one or more software copies, including the stamp history of the software copy maintaining the SHD. With reference to FIG. 1, a stamp history 100 includes the following information:

1. At 105, the license number of the software copy to which the stamp history 100 applies;
2. At 110, the session number of the last session that was run for this software copy;
3. At 115, a send count, described below;
4. At 120, a reprieve count, described below; and
5. At 125, the number of session stamps N stored in the stamp history; and
6. At 130, the session stamps of N prior sessions that were run for this software copy.

The number of session stamps N is limited to keep the size of the SHD manageable, e.g., 104 in the preferred embodiment, so that each stamp history 100 occupies 64 bytes.

The set 130 of session stamps for N prior sessions may be the stamps for the most recent N sessions of the software copy, or they may be stamps for some other well-defined subset of prior sessions, e.g., stamps for the most recent 10 sessions, plus stamps for those 100 sessions prior to the most recent 10 sessions whose session number is divisible by 5, plus stamps for the 740 sessions prior to the last 110 whose session number is divisible by 10. Maintaining a distributed sample of session stamps in this manner increases the likelihood of detecting duplicate copies of software.

Every time a software copy writes to a file, transmits data over a network, or otherwise creates data for use by other software, it appends to the data a subset of the stamp histories in its SHD. The transferal of an SHD subset via attachment to a file or other data transmission is termed an SHD transfer. The preferred embodiment appends stamp histories from 10 licensed software copies selected from the SHD, for a total of 640 bytes of data added to each file or data transmission. The number of stamp histories appended may be adjusted to trade off between memory space, network utilization, and effectiveness in catching violations.

Every time a software copy reads a file with appended stamp histories, or receives a data transmission with appended stamp histories, it merges the stamp histories into its own SHD. In this manner, each software copy's SHD is generally kept up to date with stamp histories from other software copies.

When the SHD subset is attached to a file rather than a data transmission, the software copy that reads the file may immediately write back to the file a subset from its own SHD. This provides for transfer of SHD data even when a file is only read, and not created or modified.

If two copies of software with the same license number are installed, they will generate conflicting session stamps for the same session numbers. Violations of, e.g., copyright, license agreements, etc., can thus be detected by looking for differences in session stamps for the same session number when merging SHD information. Such violations are marked, and become part of the database record. The preferred embodiment uses a reserved session stamp value of 15 to identify sessions for which a session stamp conflict has been detected. Thus, when SHD subsets are transferred from copy to copy, they include data on violations.

Figure 2:
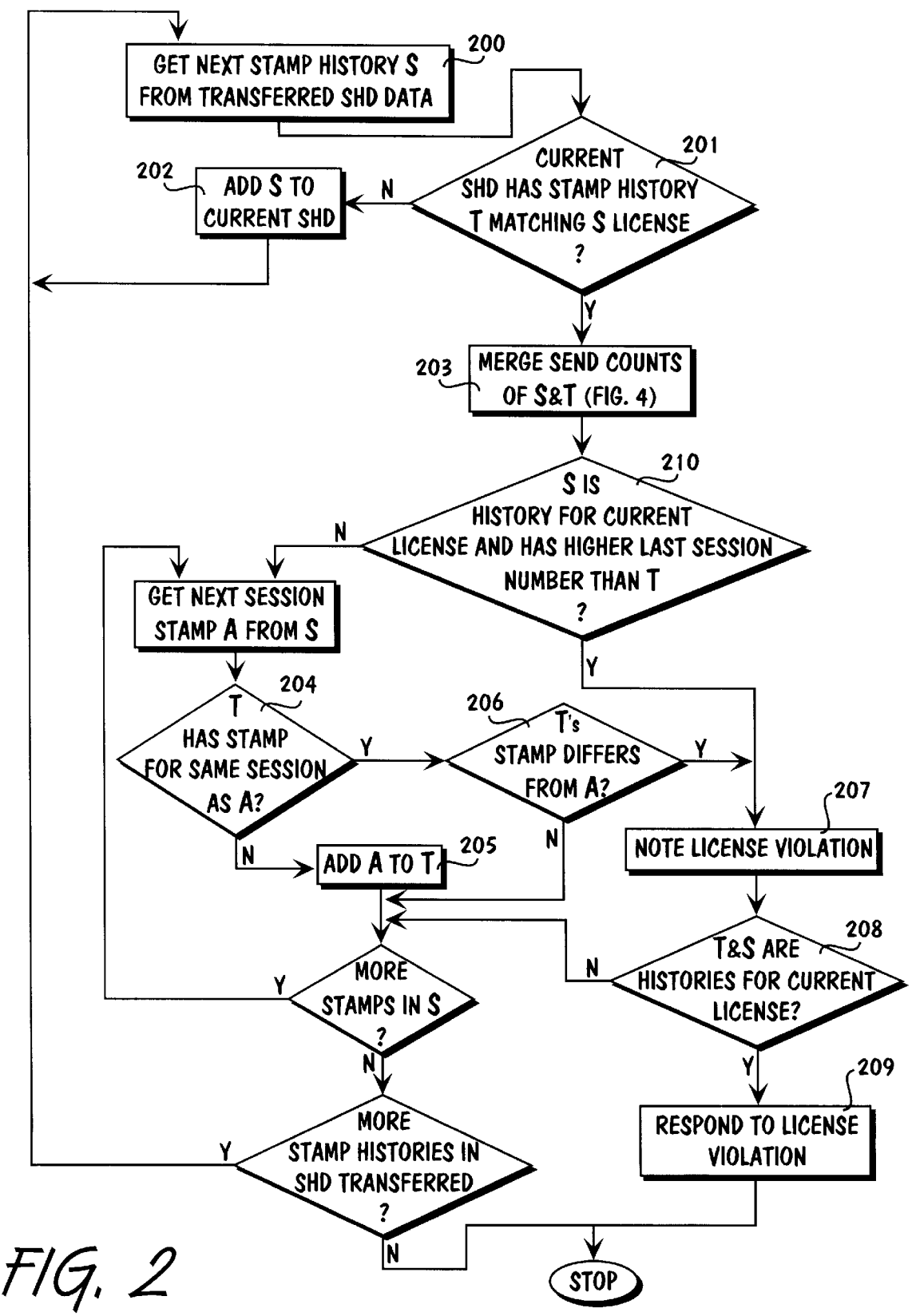
FIG. 2 is a flow chart depicting the algorithm by which a software copy receives and processes the stamp histories in an SHD transfer.

FIG. 2 illustrates how an SHD transfer is processed by a receiving software copy. At 200, the receiving copy reads the next stamp history 100 in the transferred SHD subset. At 201, for each transferred stamp history S, the receiving copy checks its SHD for a stamp history T having the same license number as S. If T is not found, then, at 202, S is added to the receiving copy's SHD, and the next stamp history is then read at 200. However, if T is found, the receiving copy first merges the send counts for S and T at 203 as discussed below with reference to FIG. 4. Then, at 210, the receiving copy determines if the license number for S is the same as that assigned to the receiving copy, and also determines if the last session number for S exceeds the last session number for T. If so, then a license violation is detected. Otherwise, at 204, for each session stamp A within S the receiving copy checks to see if T also has a session stamp for that session. If T has no session stamp for that session, then the software simply adds stamp A to T at 205. If T already has a session stamp for the session, then, at 206, the receiving copy checks to see if T's session stamp differs from A. If T's session stamp differs, then this indicates a potential violation, which is noted at 207. A noted license violation may increase the priority of T in subsequent SHD transfers, as discussed below with reference to FIG. 3. If at 208 the license number for S and T is the same as that assigned to the receiving copy performing the check, then at 209 the receiving copy takes appropriate action, such as locking or erasing itself.

The last session number from the transferred stamp history S may differ from that of T without indicating that a duplicate copy of software is in use, since different versions of stamp histories from the same copy may be in circulation at the same time. However, if the license numbers for S and T are the same as the license number assigned to the receiving copy, then T should be the most recent stamp history for that copy since it is drawn from the SHD for that copy. In this case, a higher last session number in S indicates the existence of a duplicate copy elsewhere.

A software copy detecting a violation involving its own license number indicates that another software copy with that license number is present on the same or other computer. The software can then take whatever actions are appropriate, such as locking itself, or de-installing itself from the computer. Even if the user removes the pirated copy completely and reinstalls it, thereby erasing the SHD associated with the pirated copy, the fact that violations have occurred for the license will be still be evident in files and in SHDs associated with other software copies and will cause repeated detections of the violation, in a manner similar to some computer viruses. In the preferred embodiment, a copy of software does not react to a detection of a violation on a license number associated with other software, since there is no guarantee that the violating copy is owned by the same user.

In summary, all of the copies of the software collaborate on checking for license violations through SHD transfer. It is not necessary for the software copies to be on a networked system, or even to be at the same physical site. Software copies running on physically distant computers can transfer SHD information just as easily as those linked via a network. The method may be utilized any time files or other data are generated by one software copy and transferred to another software copy.

Assuming the average SHD contains stamp histories for 1000 other copies of software, the SHD in the preferred embodiment would occupy 64000 bytes—not a prohibitive size. It is appreciated that the SHD subset attached to files or data transmissions should be kept shorter than this, however. The preferred embodiment uses SHD subset sizes of 10 stamp histories, wherein each stamp history occupies 64 bytes, for a total of 640 bytes. Because only a relatively small number of stamp histories can be transferred at a time, preference should be given to stamp histories which indicate a violation has occurred, and to those stamp histories with new session stamps that have yet to be widely distributed. The preferred embodiment uses a counting scheme that guarantees a certain number of software copies will receive each new session stamp. Each stamp history includes a send count that indicates the minimum number of other software copies that should receive a copy of this stamp history. Each time a session history is modified by adding a new session stamp, the send count is set to an initial value, such as 4. When choosing which stamp histories to include in an SHD transfer, the software picks those with the largest relative send count. When a stamp history is included in an SHD transfer, the sending software copy splits the send count between the copy of the stamp history remaining in the SHD and the copy of the stamp history being transferred as part of the SHD transfer. This makes the software copy receiving the transfer responsible in part for the notification to other software copies in turn.

Figure 3:
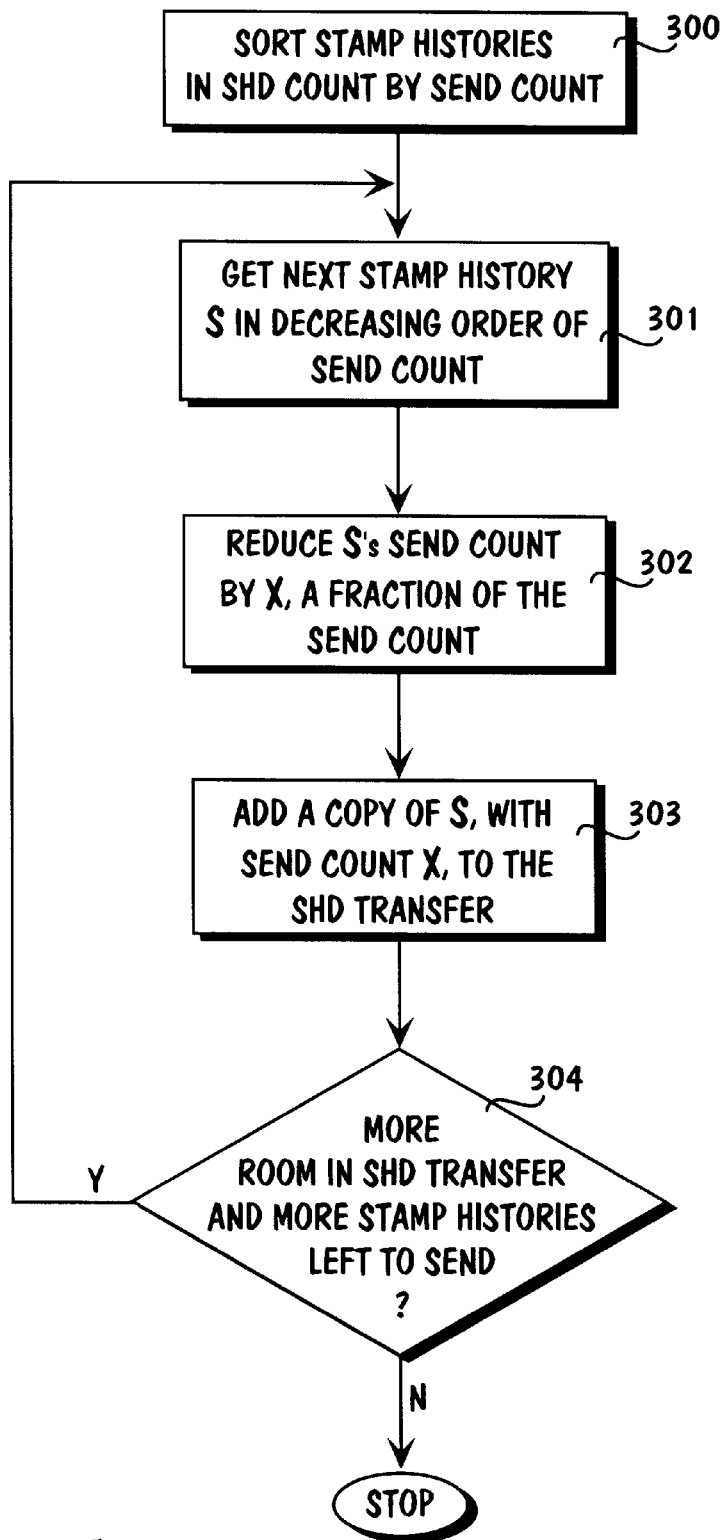
FIG. 3 is a flow chart showing how stamp histories are selected for SHD transfer by a sending software copy.

FIG. 3 illustrates the process of selecting stamp histories for an SHD transfer, and of splitting send counts. At 300, a software copy first sorts the stamp histories in its SHD in decreasing order of send count. The software copy then obtains the next stamp history S in decreasing order of send count at 301 and reduces S's send count by some value X, a suitable fraction of the send count, e.g., ⅓ or ½, at 302. The software copy places S into the SHD subset to be transferred, with the reduced send count X (303). The original send count is thus split between the S remaining in the software copy's SHD and the copy of S to be transferred. If additional stamp histories exist in the SHD at 304, the software copy repeats steps 301–303 for each stamp history in the SHD as long as there is still room in the SHD subset to be transferred.

During the sorting at step 300, several stamp histories may have the same send count. Stamp histories with the same send count appear in a random order relative to one another in the sorted SHD, so that each has an equal likelihood of being chosen for inclusion in the SHD transfer. In particular, this ensures that if there is room in the SHD transfer for stamp histories with a 0 send count, each such stamp history will be equally likely to be chosen for transfer.

Figure 4:
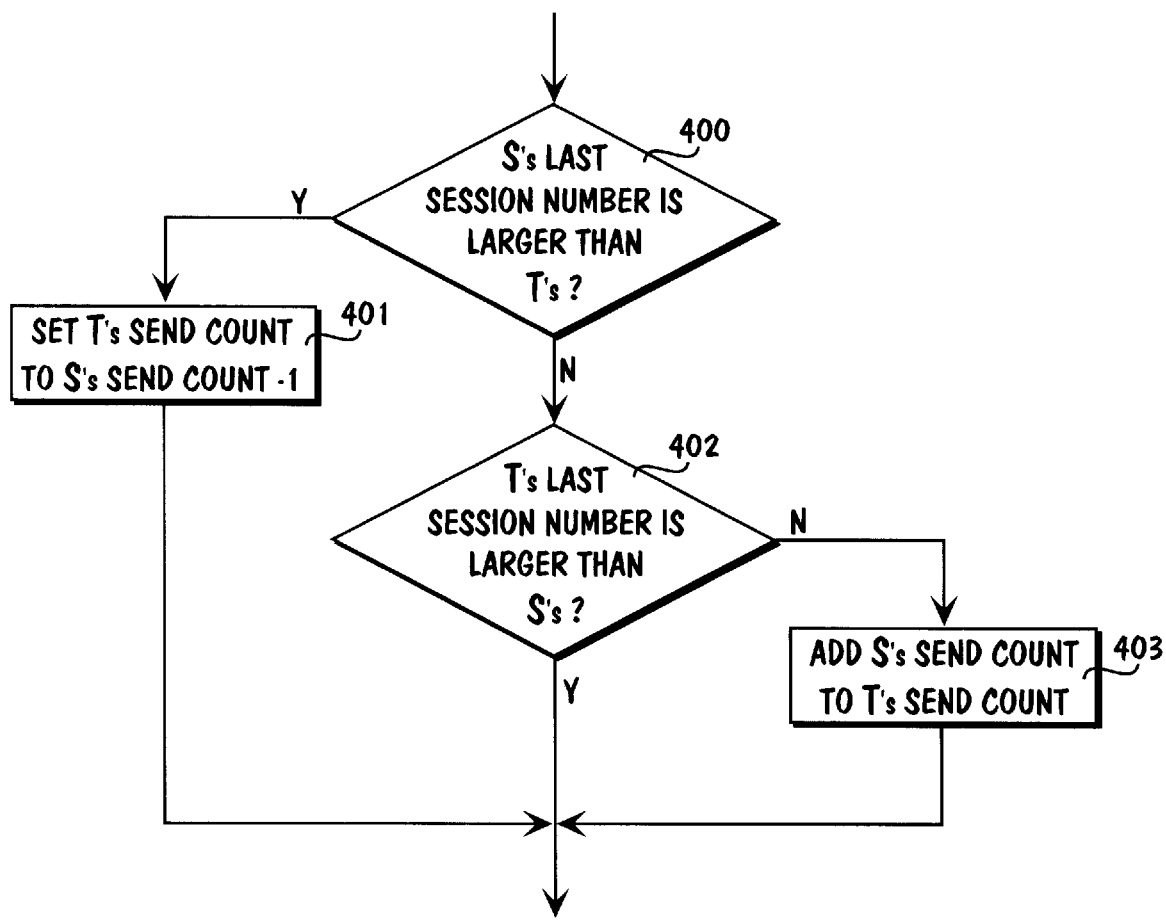
FIG. 4 is a flow chart showing how send counts are merged when an updated stamp history is received via a SHD transfer.

With reference to FIG. 4, step 203 of FIG. 2 is further described below, in which a software copy receives an SHD subset and merges send counts. The send count of a transferred stamp history S having the same license number as stamp history T is used to update the send count of stamp history T in the receiving copy's SHD. Step 400 checks to see if stamp history S has a higher last session number than stamp history T. If so, this indicates S is a more recent version of the stamp history than T. In this case, at step 401 T's send count is replace with S's send count, and decremented by one to indicate that S has been successfully sent to a new software copy, i.e., the receiving copy updating the send count. At step 402, the method determines if the last session number for S is less than T, i.e., if T is a more recent version of the stamp history than S, in which case, T's send count is unchanged. Finally, if S and T have the same last session number, then S and T should be identical, barring license violations, in which case, the receiving software copy adds S's send count to T's send count at step 403.

The algorithms described with reference to FIGS. 3 and 4 ensure that an initial send count N in the most recent version of a stamp history S must be transferred to N different copies of software in order for all copies of S to have a send count of 0. It should be noted that the only time a send count is reduced (as opposed to being divided between two copies) is when a copy of S is newly added to an SHD. It is further appreciated that to distribute information on license violations more widely, a larger initial send count can be assigned to stamp histories that show stamp conflicts (e.g., 15).

The described method will not detect small numbers of illegitimate software copies at widely different locations, between which data or files are not shared. This is not the usual scenario for copyright violations or the like, however. The described method is well suited for violations by workers or students taking private copies of software home, or for site violations where multiple software copies are made for a cluster of computers in a lab or office. In the egregious case of a single software copy being duplicated for widespread sale (common in countries with poor copyright protections) the method produces widespread violation detections, since only a few license numbers would be in existence for thousands of distributed software copies, assuming a good encryption scheme is used to prevent fabrication of license numbers, such as the methods used to prevent fabrication of credit card IDs.

The described method does not require that the cooperating copies of software all be of the same program. Copies of software with widely varying purposes can still cooperate in maintaining SHDs and transferring them, as long as a standard format is maintained for the SHD transfers and as long as each copy is given a unique license number. The method could be incorporated into an operating system, with the SHD maintained by the operating system, and with SHD transfers automatically added by the operating system to all files or data transfers between computers.

Software embodying the present invention utilizes installation software termed the installer. The installer is not essential to the security of the method, but makes the method much easier to use. The installer has its own SHD, held on a disk or other storage media. The installer's SHD contains stamp histories for a set of license numbers which the installer can install or remove from different computers. The installer allows the user to install copies of the software with any of these license numbers on any computer, but prevents the user from accidentally or deliberately installing multiple copies of the software with the same license numbers, by tracking which numbers have been installed, and which are still available for installation. Users may want to transfer software copies from one computer to another. Transferring a software copy to another computer requires transferring its current stamp history as well. To uninstall a software copy, the installer reads the stamp history of the copy from the copy's SHD and saves this stamp history in the installer's SHD. The installer then removes the software copy and the copy's SHD from the computer. When reinstalling the software copy, the installer transfers the copy's stamp history from the installer's SHD into the newly installed SHD associated with the software copy.

The installer will not install more than one software copy at a time of a given license number until the present copy is uninstalled. In two events this can present a problem for honest users. First, an installed software copy or its SHD may be accidentally destroyed. Even if a backup copy is available, the backup will have an older version of the SHD, which will have an out-of-date stamp history for the license number in question. The restored software copy will thus generate new session stamps for already-used sessions, and show a violation with its own previously generated stamps. In another case, an honest user might find that the described method detects a violation because someone took an illegitimate copy without the user's knowledge. These problems are alleviated by the use of reprieves.

Associated with each license number is a reprieve count, initially set to a value of 0. The reprieve count is included with the license number in each stamp history, and is transferred during SHD transfer. When a license number shows a violation, the installer may be used to uninstall and reinstall the same license number, with an incremented reprieve count, up to some maximum number of reprieves permitted. With a new reprieve count, the session numbering starts again from 0, with no violations. When SHDs are merged, more recent stamp histories, i.e., stamp histories with a high reprieve count, replace stamp histories for the same license number with a lower reprieve count, so that the relatively older stamp histories, i.e., the stamp histories with a lower reprieve count, are gradually eliminated. Thus, if an illegitimate software copy with an old, lower reprieve count encounters a stamp history with a higher reprieve count, this indicates a license violation, and the software reacts accordingly. Thus, the legitimate user can indirectly eliminate illegitimate software copies by increasing the reprieve count and letting the increased reprieve count propagate via SHD transfer.

The described method can be extended to permit protection of data items, such as a file, photograph, or audio clip. To do this, encrypt the data item, and supply viewing software that is able to decrypt and display the data. The viewing software is copy-protected using the method described. The data encryption is designed so that only selected copies of the viewing software may decrypt the data. According to the preferred embodiment of the present invention, the license number of one copy of the viewing software is used as an encryption key, so that only that copy of the viewing software has the information needed to decrypt the data. According to an alternative embodiment, the data is encrypted in such a manner that any copy of the viewing software can decrypt the data, but included in the data is a list of the license numbers of the viewing software that are permitted to use the data. The viewing software is designed to check this list and prevent the user from displaying the data if its corresponding license number is not in the list.

The described method can also be used to detect continued use of outdated versions of a copy of software after a newer version of the software has been installed. When an older version of a software copy is replaced by a newer version, the newer copy is assigned the same license number as the older copy, and the older copy's stamp history is placed in the newer copy's SHD, becoming the initial stamp history for the newer copy. If the older version remains in use on the same or another computer, session stamp conflicts will arise since the older and newer versions have the same license number. The method can thus detect continued use of an older version in the same way it detects use of duplicate copies of the same versions. In addition, the reprieve count described above can be used to automatically deactivate older versions. The newer version is assigned a higher reprieve count than the older version. When the older version detects stamp histories from the newer version, which stamp histories have a higher reprieve count, it treats this as a license violation and erases or deactivates itself.

The described method can also be used to limit the number of times a copy of software is executed by designing the software to cease executing once a certain session number has been reached. The session number after which execution will cease may be included with the encrypted license number, and checked by the software at the start of each session. Backup and reinstallation of the software copy to reset the session number will result in detection of session stamp conflicts if any SHD transfer data from the prior installation remains in files or in other software copies' SHDs.

What is claimed is:

1. A method of detecting duplicate copies of a computer program, comprising:

assigning a first identifier to a copy of a computer program;

assigning a second identifier to each session of the copy;

assigning a stamp to each session;

maintaining in a data structure for the copy the first identifier assigned to the copy, a second identifier to be assigned to a next session of the copy and the stamps assigned to previously initiated sessions of the copy; and detecting duplicate copies of the computer program if two copies of the computer program are assigned the same first identifier, yet have a different second identifier or different stamps assigned to the previously initiated sessions, as determined from the maintained data structure.

2. The method of claim 1, wherein assigning a second identifier to each session of the copy includes assigning a sequential number to each session of the copy.

3. The method of claim 1, wherein assigning a stamp to each session comprises:

generating a random stamp; and assigning the random stamp to the session.

4. The method of claim 1, wherein the first identifier is a license number.

5. The method of claim 4, further comprising detecting a duplicate copy if the license identifier in the stamp history from the first copy is identical to the license identifier in the stamp history maintained by the second copy, and the sequential session number in the stamp history from the first copy is greater than the sequential session number in the stamp history maintained by the second copy, and the license identifier in both the stamp history from the first copy and the stamp history maintained by the second copy is identical to the license identifier assigned to the first copy.

6. The method of claim 1, wherein previously initiated sessions comprise all of the previously initiated sessions.

7. The method of claim 1, wherein previously initiated sessions comprise a subset of all the previously initiated sessions.

8. A method of detecting multiple copies of a computer program, comprising:

assigning a license identifier to each copy of a plurality of computer programs;

assigning a session identifier to each session of each copy;

assigning a random session stamp to each session;

maintaining a stamp history for each copy, comprising the license identifier assigned to the copy, the session identifier of a most recent session of the copy, and a list of the random session stamps assigned to previously initiated sessions of the copy;

transferring a stamp history from a first copy to a second copy;

comparing the stamp history from the first copy with a stamp history maintained by the second copy; and detecting a duplicate copy if the license identifier in the stamp history from the first copy is identical to the license identifier in the stamp history maintained by the second copy, and the session identifier in the stamp history from the first copy is different from the session identifier in the stamp history maintained by the second copy or the random session stamp assigned to any session identifier in the stamp history from the first copy differs from the random session stamp assigned to the same session identifier in the stamp history maintained by the second copy.

9. The method of claim 8, further comprising marking the stamp history from the first copy to indicate the duplicate copy exists if the duplicate is detected.

10. The method of claim 9, wherein marking the stamp history from the first copy to indicate the duplicate copy exists comprises modifying the random session stamp assigned to the session identifier in the stamp history from the first copy to a value reserved to indicate the duplicate copy exists.

11. The method of claim 10, wherein the stamp history for each copy further comprises a send count.

12. The method of claim 11, wherein transferring a stamp history includes:

appending a plurality of the stamp histories from the first copy to data output by the first copy;

receiving at the second copy the data output by the first copy including the plurality of the stamp histories from the first copy appended to the data; and updating each stamp history maintained by the second copy according to the plurality of stamp histories from the first copy received by the second copy.

13. The method of claim 12, wherein appending a plurality of the stamp histories from the first copy to data output by the first copy further comprises selecting based on the send count which of the plurality of the stamp histories from the first copy are to be appended to data output by the first copy.

14. The method of claim 8, wherein assigning a session identifier comprises assigning a sequential session number.

15. The method of claim 8, wherein transferring a stamp history from a first copy comprises transferring a stamp history for the first copy.

16. The method of claim 8, wherein transferring a stamp history from a first copy comprises transferring a stamp history for a third copy.

17. The method of claim 8, wherein previously initiated sessions comprise all of the previously initiated sessions.

18. The method of claim 8, wherein previously initiated sessions comprise a subset of all the previously initiated sessions.

19. The method of claim 8, wherein the stamp history maintained by the second copy includes a stamp history for the second copy.

20. The method of claim 8, wherein the stamp history maintained by the second copy includes a stamp history for a third copy.

21. A method of limiting access to a data item, comprising:

assigning a first identifier to each copy of a plurality of computer programs;

assigning a second identifier to each session of each copy;

assigning a stamp to each session;

maintaining in a data structure for each copy the first identifier assigned to the copy, a second identifier to be assigned to the next session, and the stamps assigned to previously initiated sessions;

disabling one of two copies, if the two copies are assigned the same first identifier, yet have a different second identifier assigned to the next session or different session stamps assigned to the previously initiated sessions, as determined from the data structure maintained for each copy.

22. The method of claim 21 further comprising:

encrypting a data item using the first identifier assigned to a copy of the plurality of computer programs as a key; and denying access to the data item for each copy other than the copy whose first identifier is provided as the key for encrypting the data item.

23. An article of manufacture comprising a machine readable medium having a plurality of machine readable instructions stored thereon, wherein the instructions, when executed by a processor, cause the processor to:

assign a license identifier to a copy of a computer program;

assign a session identifier to each session of the copy;

assign a session stamp to each session;

maintain for each copy in a data structure, the license identifier assigned to the copy, a next session identifier to be assigned to the next session of the copy and the session stamps assigned to previously initiated sessions of the copy; and detect if two copies are assigned the same license identifier, yet have a different next session identifier or different session stamps assigned to the previously initiated sessions for the copy, as determined from the data structure maintained for each copy.

24. The article of manufacture of claim 23, wherein the instructions that cause the processor to assign a session identifier to each session of the copy comprise instructions that when executed by the processor, cause the processor to assign a sequential session number to each session of the copy.

25. The article of manufacture of claim 23, wherein the instructions that cause the processor to assign a session stamp to each session comprise instructions that when executed by the processor, cause the processor to:

generate a random session stamp; and assign the random session stamp to the session.

26. A method of detecting multiple copies of a computer program comprising:

assigning a first unique identifier to each copy of a plurality of computer programs;

assigning a second identifier to each session of each copy;

assigning a random session stamp to each session;

maintaining in a central stamp history database, a stamp history for each copy including the first identifier assigned to the copy, a second identifier to be assigned to a next session of the copy and the stamps assigned to previously initiated sessions of the copy; and detecting by the central stamp history database duplicate copies of the computer program if two copies of the computer program are assigned the same first identifier, yet have a different second identifier or different stamps assigned to the previously initiated sessions, as determined from the centrally maintained stamp history database.

27. The method of claim 26, wherein the copies of the plurality of computer programs need not be copies of the same program.

* * * * *